United States Patent [19]

Brosch et al.

[11] Patent Number: 5,244,483
[45] Date of Patent: Sep. 14, 1993

[54] APPARATUS FOR PRODUCING GLASS FILAMENTS

[75] Inventors: Eric J. Brosch, Grand Rapids; Randy A. Limmer, Whitehouse; William M. Lafayette, Toledo, all of Ohio

[73] Assignee: Manville Corporation, Denver, Colo.

[21] Appl. No.: 680,332

[22] Filed: Apr. 4, 1991

[51] Int. Cl.⁵ ............................................. C03B 37/02
[52] U.S. Cl. ...................... 65/12; 65/374.12; 420/463
[58] Field of Search .................. 65/1, 12, 374.12; 420/463

[56] References Cited

U.S. PATENT DOCUMENTS

| | | | |
|---|---|---|---|
| 3,219,426 | 11/1965 | Steer | 65/374.12 X |
| 3,392,779 | 7/1968 | Tilbrook | 65/374.12 X |
| 3,488,172 | 1/1970 | Aliotta et al. | 65/1 |
| 3,647,382 | 3/1972 | Tilbrook | 65/12 |
| 4,397,665 | 8/1983 | Harris | 65/12 |

*Primary Examiner*—Robert L. Lindsay
*Attorney, Agent, or Firm*—Cornelius P. Quinn

[57] ABSTRACT

The apparatus includes a bushing, a cooling assembly, a sizing applicator, a glass filament gathering pad and a winder. A tip section of the bushing is provided with rows of tips having orifices from which streams of molten glass are attenuated into filaments. The tip section is recessed within an insulated frame that supports the bushing so that the insulated frame reflects heat back to the outer tip rows. The glass filaments are drawn from the bushing tips by the winder with the gathering pad functioning to gather the filaments together into a strand which is wound on the winder. Finned cooling tubes or a combination of finned cooling tubes and finless cooling tubes are located beneath the bushing in proximity to and between at least some of the rows of tips to maintain a more uniform temperature among the glass globules issuing from the tips in the various rows. The cooling tubes and fins are fabricated of an alloy having a major portion of palladium and a minor portion of ruthenium.

2 Claims, 5 Drawing Sheets

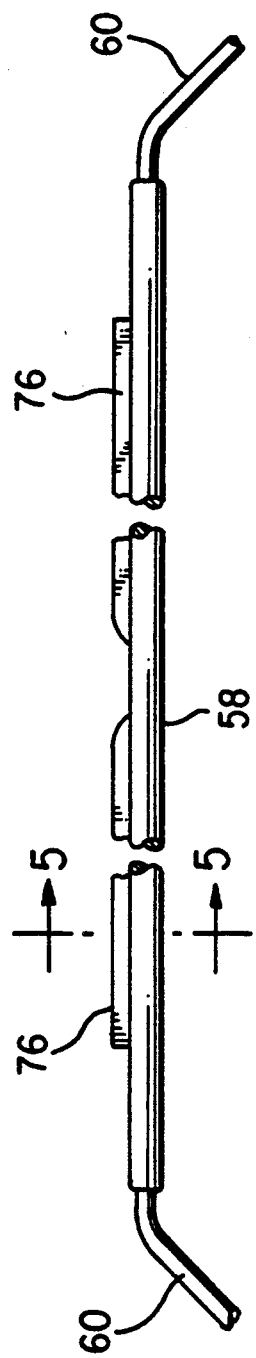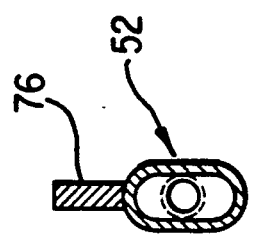

APPARATUS FOR PRODUCING GLASS FILAMENTS

TECHNICAL FIELD

The present invention relates to an apparatus for producing glass filaments and, in particular, to an apparatus for producing glass filaments which is provided with heat exchange means for maintaining the glass globules which are formed at the bushing tips at a more uniform temperature.

BACKGROUND ART

This is an improvement to the apparatus for producing glass filaments disclosed in U.S. Ser. No. 317,854, filed Dec. 22, 1972, by Walter W. Harris, now abandoned. This specification adopts that portion of the disclosure of the earlier application necessary to the teaching of the present improvement.

Glass filaments are produced by attenuating continuous threads of molten glass from a plurality of small tips or orifices located in a bottom wall of a heated vessel called a bushing. The molten glass forms globules at discharge ends of the tips. Due to the attenuation of the glass which is being drawn from the globules into filaments, these glass globules are shaped like inverted cones. With this type of forming process, the original viscosity of the glass making up each globule and the viscosity change of the glass in each globule from the base to the apex of the cone affects the diameter of the filament formed and the production rate of the filament forming process. The more uniform the original viscosity is for the globules and the more uniform the change in viscosity is among the globules, the more uniform the filament diameters and the better the production rate.

Since the initial viscosity of the glass and the change in the viscosity of the glass from the base to the apex of a cone is directly related to the temperature of the glass, the quality of the filaments in terms of uniform diameter and the production rate of the filament forming process depends to a large extent on the temperatures of the tips and the molten glass globules formed at the tips. The more uniform the temperatures and temperature changes are, the more uniform the diameters of the various filaments are and the better the production rate is for a particular diameter filament.

If the inverted glass cone at the tip is subjected to an excessive temperature, the viscosity of the cone is reduced to such an extent that the molten glass can no longer support the continuous filament depending therefrom and the filament breaks off. This condition is referred to as streaking or burn-off. The deviation between the burn-off temperature of the tip and the operating temperature required for maximum productivity is a judgment factor generally established by trial and error while operating the bushing. There must be a satisfactory margin between the burn-off temperature and the actual operating temperature of the bushing to compensate for viscosity changes caused by variations in the homogeneity of the glass, the uncontrolled variations of tip temperature due to minor inaccuracies in the power control response, tip configuration, or other factors which can affect the temperature of the bushing.

In practice, bushings have multiple tips, e.g., 400, 800, 1,600, 2,400. Therefore, the maximum melt rate or productivity which can be obtained depends upon the hottest tip or group of tips characteristic of the particular bushing design for the temperature of these tips must be regulated so as to be below the burn-off temperature. To do this, other tips which are not as hot will have temperatures farther away from the optimum temperature with the amount of temperature variation between the tips determining how far from the optimum temperature the other tips are operating. For the bushing to perform satisfactorily, the temperature of the coldest tips at the outside rows must exceed a certain value or cold beads will form thus interrupting the continuous drawing operation. In other words, the tip temperature among all tips must fall within a specific range so that the glass viscosity will remain suitable for continuous attenuation. If the temperature variation is too great, one will experience burn-off at the hotter tips and/or beading at the coldest tips. In addition, even if neither of these conditions occurs if the temperature variation is large enough, the bushing will not operate at a very high efficiency. While some of the tips may be operating at a satisfactory margin with respect to the burn-off temperature thereby optimizing the production of these tips other tips may be operating at a temperature variation which, although not sufficient to cause bead-out will cause the flow of glass from those orifices to be considerably less than the desired flow rate. Consequently, it is desirable to maintain the various tips at a uniform temperature so that the tips can be operated as close as possible to the burn-off temperature.

The temperature of a cone can drop about 1,350° F. in a fraction of an inch between the base of the cone at the tip and the apex of the cone. The outside tip rows are exposed to the relatively cool ambient atmosphere. In addition, the rapidly moving filaments (for example, 800 to 1,600 filaments moving at 10,000 feet per minute) act as an air pump drawing ambient air onto the surface of the outside tips to thereby cool these tips. In contrast, the inner tips receive radiant heat from adjacent tips and the thermal effect of the air currents produced by the filaments drawn from these tips are quite different from those caused by the air currents generated by the filaments of the outer rows which drawn in the ambient air. Consequently, the temperature drop in the glass globules of the inner and outer tip rows can vary as much as 100° F.

Another factor which makes it difficult to maintain a uniform temperature among the many glass globules is the poor temperature balance of the molten glass at various levels in the bushings itself. This is particularly true at levels near the bottom of the bushing. In other words, the temperature isotherms in the bushing are not planar. A majority of the heat in the molten glass globules comes from the molten glass in the bushing. Consequently, with nonuniform glass temperatures in the bushing above the tips, the temperatures of the glass in the tips will not be uniform In fact, one of the prime objectives of bushing development is to obtain planar temperature isotherms in the lower levels of the bushings.

From the above, it is clear that one of the main objectives in the design of a bushing for either the direct melt or the marble melt process is to obtain an even temperature profile across the tip section of the bushing. In other words, the temperature must be as uniform as possible among the various tips. This is required to achieve a maximum productivity or operating efficiency. It is also required to obtain the best quality fiber since the uniformity of the fiber diameter, which is a prime requisite for many end uses, depends upon obtaining the same glass flow from each tip which, in turn, depends to a large extent upon maintaining a uniform temperature among the tips.

To improve the efficiency of glass filament production, it has been necessary to provide external cooling devices positioned close to the bushing tips to prevent the inner tips from overheating. This is generally done by the use of water cooled tubes or solid heat conduction fins connected to a water header located outside of the bushing tip area and generally on one side of the bushing. The tubes or fins are generally located between pairs of tip rows with each pair of tip rows being spaced from adjacent pairs of tip rows.

The service demands on the water cooled tubes and the heat conduction fins are extreme. They must be able to withstand the high temperatures associated with glass fiber production in a corrosive environment. Further, such heat exchange devices must possess requisite mechanical strength, but not be so rigid as to be unbendable or unformable to match the surface contour of the bushing tip plate over its service life.

In practice these tubes and fins have been formed of an alloy constituted predominantly of platinum-group metals, e.g., an alloy of 80% platinum—20% rhodium by weight. Only precious metal alloys of this class were known to possess the physical properties necessary to meet the service demands. However, given the scarcity and expense of these metals their use defined a problem which the present invention addresses. Other non-precious metals such as copper, nickel and Inconnel have been tried, but all have failed due to the temperature and corrosive conditions in the environment of the cooling tubes and heat conduction fins.

DISCLOSURE OF THE INVENTION

Accordingly, the present inventions comprises an improvement to apparatus for producing glass filaments having heat exchange means, such as finned cooling tubes, supported beneath and in proximity to the tips of a bushing.

The improvement, and the object of this invention, is to provide heat exchange means formed of an alloy which meets the previously described service demands, but is less costly and more readily available. The inventors have discovered that an alloy constituted of palladium (Pd) and ruthenium (Ru), having a major portion of Pd serves satisfactorily as the material from which water cooled tubes and heat radiant fins may be fabricated.

BRIEF DESCRIPTION OF THE DRAWINGS

FIG. 4 is a side view of one of the cooling tubes of FIG. 2 wherein the fins extend the full length of the tip section; and FIGS. 5–9 are cross-sectional views of finned cooling tubes of the present invention to illustrate various configurations that the tubes of the present invention can assume.

BEST MODE FOR CARRYING OUT THE INVENTION

Figure 1:
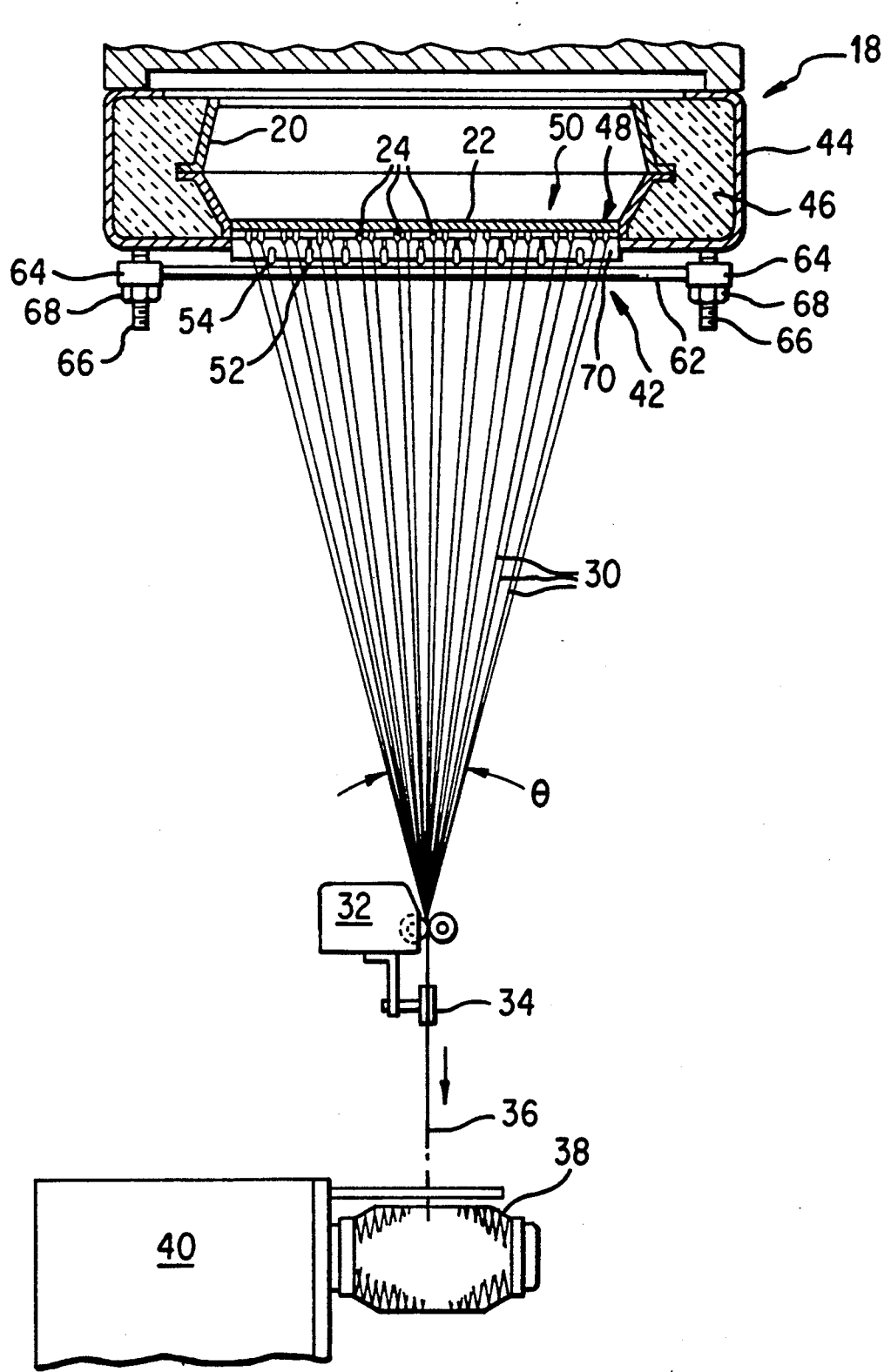
FIG. 1 is a transverse cross-sectional view of a bushing and cooling assembly of the present invention along with apparatus for attenuating molten glass or other heat softened material into fine continuous filaments.
Figure 2:
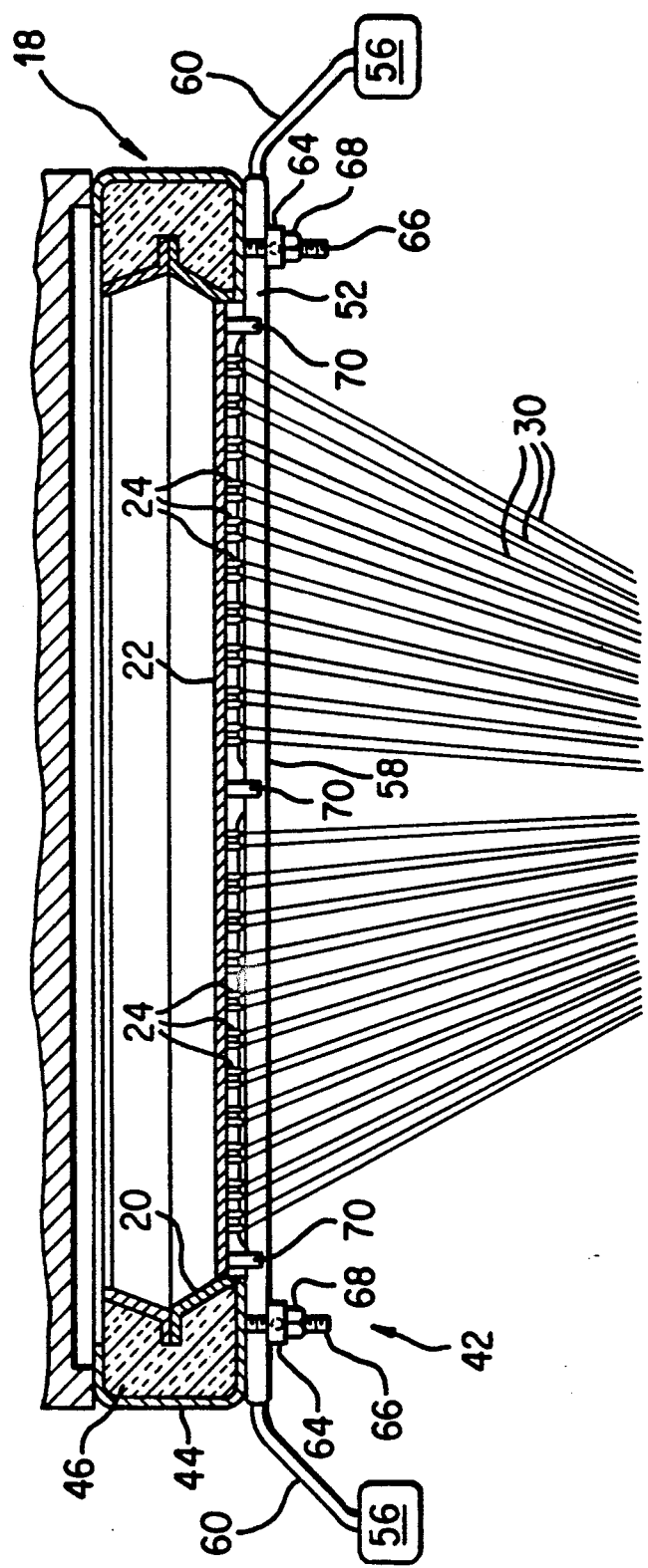
FIG. 2 is a longitudinal cross-sectional view of the bushing and cooling assembly of FIG. 1.
Figure 3:
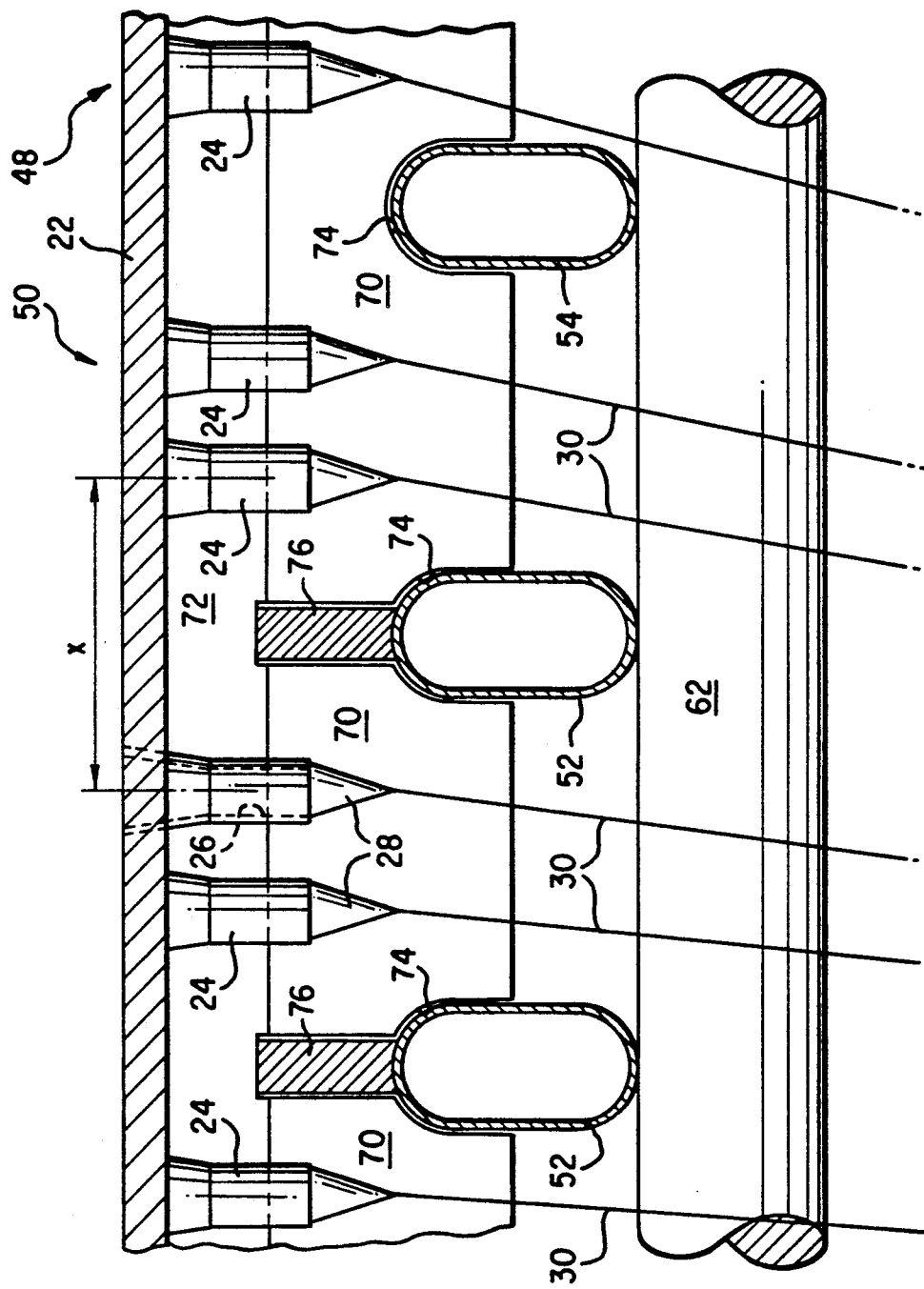
FIG. 3 is a fragmentary sectional view of the bushing tip section to better illustrate the relative positions of the bushing tips and the cooling tubes.
Figure 6:
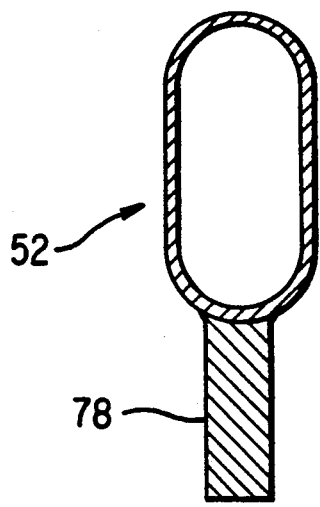

FIG. 1 illustrates a bushing assembly 18 and cooling tube assembly of the present invention in combination with apparatus for drawing streams of glass from the bushing and attenuating the glass into fine continuous filaments that are collected into a strand and formed into a package. A bushing 20 of the bushing assembly 18 is either connected with a forehearth which receives refined heat softened glass from a melting furnace or glass spheres or marbles are melted in the bushing at a rate equal to the rate at which the glass is drawn from the bushing. A bottom wall or tip plate 22 of the bushing is provided with rows of tips or projections 24 which depend from the wall 22 and are generally arranged in pairs of rows which are separated from adjacent pairs of rows by a somewhat greater spacing. The glass drawn from the bushing passes out through orifices 26 in these tips and forms inverted cone-shaped globules 28 at the tip ends. From these globules the glass is drawn and attenuated into filaments 30. The filaments 30 can then have a sizing applied by an applicator 32 after which they are collected together by a gathering pad 34 and formed into a strand 36 which is wound into a package 38 by a conventional winding apparatus 40.

A heat exchange assembly 42 of the present invention is located beneath the bushing wall 2 in proximity to the rows of tips 24. The heat exchange assembly of the present invention functions to minimize temperature differentiations between the various tips to thereby make the temperature at the tips more uniform throughout the rows. This, of course, assures that the initial temperature and viscosity of the glass forming the globules 28 at the ends of the tips 24 is more uniform throughout the bushing tip section. In addition, the heat exchange assembly of the present invention insures a more uniform temperature change in the globules 28 throughout the bushing tip section. Consequently, since the initial temperature at the bases of the globules and the changes in temperature from the bases to the apexes of the glass globules are more uniform, the initial viscosities and the changes in the viscosities of the glass globules will be more uniform and the glass filaments 30 formed from the various tips will be more uniform in their diameters to thereby minimize deviation from the desired filament diameter.

The bushing 20 is generally about 6 to 8 inches wide by 18 to 24 inches in length by 6 to 10 inches in height. The bushing 20 is supported by a bushing frame 44 which is separated from the bushing by bushing insulation 46 to prevent heat transfer from the bushing to the frame. The bushing is generally mounted within the frame so that the tip section of the bushing is flush with the bottom of the frame. However, the bushing utilized with the heat exchange assembly 42 of the present invention has the bushing tip section recessed up within the frame about ¼ of an inch. With this construction, the insulation at the sides of the frame reflects heat back to the outer tip rows 48 and partially shields the outer tip rows from cool air currents generated by the filaments 30 as they are drawn from the tips. Thus, this feature contributes to the equalization of temperatures between the outer tip rows 48 and the inner tip rows 50 since it serves to increase the temperature of the outer tip rows relative to the temperature of the inner tip rows.

In the preferred embodiment, the cooling assembly 42 of the present invention comprises finned cooling tubes 52 and finless cooling tubes 54. These cooling tubes extend longitudinally with respect to the bushing and are secured at either end to manifolds 56 which provide an inlet and outlet for the water or other cooling fluid which passes through the cooling tubes 52 and 54. The cooling tubes each have a central portion 58 which extends parallel to the lower surface of the tip plate 22 for the entire length of the tip plate. At each end of the bushing, end portions 60 of the cooling tubes extend downward from the central portion 58 at an angle of about 45° to the manifolds 56. Support bars 62 are carried at each end of the bushing by brackets 64 located on either side of the bushing. The cooling tubes 52 and 54 rest on the support bars 62 which pass beneath the cooling tubes at the ends of the central portions 58 of the tubes. The brackets 64 are mounted on studs 66 which are welded or otherwise affixed to the frame 44 and pass through the brackets 64. By tightening or loosening nuts 68 on the studs which engage the underside of brackets 64, the vertical distance between the cooling tubes and the tip section can be adjusted.

The tubes are maintained in parallel alignment with the tip rows 48 and 50 plus the tip plate 22 by three tube guides 70 which extend the width of the bushing and also lend support to the tip plate 22 of the bushing. The tube guides 70 are welded or otherwise anchored at each end to the bushing support frame 44 and are insulated from the tip plate by a refractory non-conducting cement 72 to prevent the conduction of heat away from the tip plate by the tube guides. One of the tube guides 70 passes beneath the center of the tip plate 22 while the other two tube guides pass beneath the ends of the tip plate to thereby support the tip plate at its mid-portion and ends. The tube guides have slots 74 therein which are complimentary in configuration to the outer surfaces of the cooling tubes. The tubes 52 and 54 are received within and extend through these slots which thereby maintain the tubes in proper alignment with the tip rows and the tip plate.

Since the preferred embodiment of the invention utilizes cooling tubes 52 having oval cross sections such as those shown in FIG. 5, the use of these tubes will be discussed in detail. However, it is contemplated that the other cooling tubes such as those illustrated in FIGS. 6–9 can also be employed. A typical oval cooling tube 50 has a minor axis 5/32 or 0.156 inches in length and a major axis 5/16 or 0.31 inches in length. The tubes are mounted with their major axis in a vertical plane and are guided by the slots 74 in the tube guides 70. The depths of the slots are typically about half the height of the tube guides 70 or about 0.155 inches. If the slots are of any greater depth, the slots tend to weaken the tube guides 74 to such an extent that they no longer provide the required support for the tip plate of the bushing which will then tend to sag.

It has been found that cooling tubes and their associated fins may be formed of an alloy constituted of a majority of palladium and a minority of ruthenium, with a preferred ratio of 95% palladium to 5% ruthenium by weight. The presence of the ruthenium adds mechanical strength to the relatively softer palladium. The alloy is selected not to be so rigid as to prevent the cooling tubes and fins from being formable to match the surface contour of the bushing tip plate, including progressive convexity of the tip plate over its operating life due to sag experienced in its high-temperature service environment.

The cooling tubes may be fabricated by known extrusion techniques, and the fins are formed by stamping. The fins may be affixed to the tubes by welding.

Figure 7:
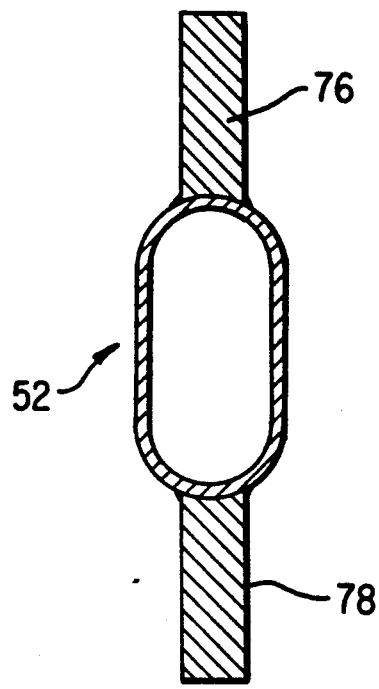
Figure 8:
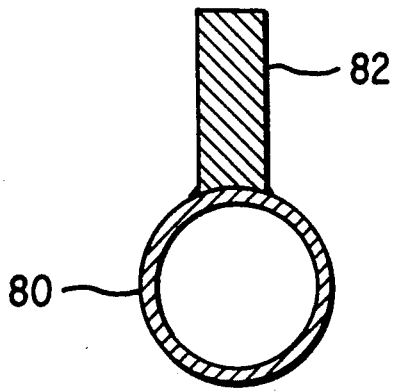
Figure 9:
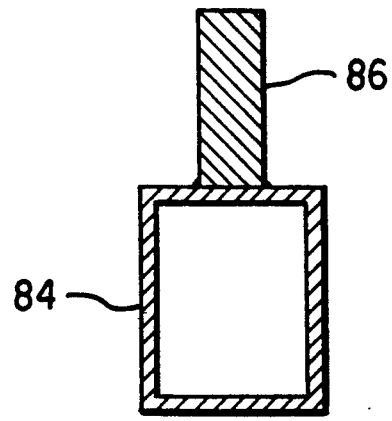

While the preferred embodiment is shown with oval-shaped or ellipsoidal tubes having fins 76 projecting from the upper surface, it is contemplated that the cooling tubes can have fins 78 projecting from the underside of the tube (FIG. 6) or from both the upper and under sides of the tubes as illustrated in FIG. 7. While the fins 78 do not improve the performance of the cooling tube assembly like the upwardly projecting fins 76, the fins 78 still increase the effective cooling surfaces of the tubes. FIG. 8 illustrates a finned tube 80 having a circular cross section and a fin 82 projecting from the upper surface of the tube. FIG. 9 illustrates a finned tube 84 having a rectangular cross section with a fin 86 projecting from the upper surface. Of course, the rectangular cross section could be a square. While they are not shown, it is contemplated that the round and rectangular tubes can also be provided with downwardly extending fins in addition to or in place of the fins on their upper surfaces. In addition, more than one fin can be provided on an upper or lower surface of the cooling tube.

The embodiments of the invention in which an exclusive property or privilege is claimed are defined as follows:

1. An improved apparatus for producing glass filaments of the type comprising a bushing plate having a plurality of tips formed therein through which molten glass is drawn into fibers the bushing plate becoming progressively convex over its operating life, and heat exchange means, positioned in proximity with the bushing tips, for promoting uniform cooling of glass issuing from said tips, the improvement characterized in that:

the heat exchange means include tube members positioned in proximity to the bushing tips and mounted to bend with the bushing plate to match the convexity of the bushing plate, said tube members being adapted to circulate a working fluid for the absorption and transmittal of thermal energy, said tube members being formed of an alloy constituted of 95% palladium by weight and 5% ruthenium by weight, and the alloy having mechanical strength and formability whereby the heat exchange means members have strength to perform at high temperatures associated with glass fiber production and formability to bend to match the progressive convexity of the bushing plate over the operating life of the bushing plate.

2. The improved apparatus of claim 1 wherein the tubes are selectively finned for absorption and radiation of thermal energy by the fins.

* * * * *